(12) United States Patent
Higuchi

(10) Patent No.: US 10,914,034 B2
(45) Date of Patent: Feb. 9, 2021

(54) SHEET MANUFACTURING APPARATUS

(71) Applicant: SEIKO EPSON CORPORATION, Tokyo (JP)

(72) Inventor: Naotaka Higuchi, Fujimi-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 174 days.

(21) Appl. No.: 16/142,932

(22) Filed: Sep. 26, 2018

(65) Prior Publication Data

US 2019/0093286 A1    Mar. 28, 2019

(30) Foreign Application Priority Data

Sep. 28, 2017  (JP) ................. 2017-189229

(51) Int. Cl.
| | |
|---|---|
| *D21F 1/02* | (2006.01) |
| *D21F 1/48* | (2006.01) |
| *D21F 7/06* | (2006.01) |
| *D21F 2/00* | (2006.01) |
| *D01G 25/00* | (2006.01) |

(Continued)

(52) U.S. Cl.
CPC ............. *D21F 1/028* (2013.01); *D01G 25/00* (2013.01); *D04H 1/732* (2013.01); *D21B 1/08* (2013.01); *D21F 1/48* (2013.01); *D21F 2/00* (2013.01); *D21F 7/06* (2013.01); *D21H 5/2621* (2013.01)

(58) Field of Classification Search
CPC ... D21F 1/52; D21F 1/526; D21F 7/06; D21F 1/028; D04H 1/72; D04H 1/732; D04H 1/736; D21H 5/2621; D21H 11/14; D21B 1/06; D21B 1/061; D21B 1/08; D21B 1/10

See application file for complete search history.

(56) References Cited

U.S. PATENT DOCUMENTS

| 8,882,965 B2 | 11/2014 | Yamagami et al. |
| 9,771,685 B2 | 9/2017 | Omagari et al. |

(Continued)

FOREIGN PATENT DOCUMENTS

| CN | 105986496 A | 10/2016 |
| CN | 205613344 U | 10/2016 |

(Continued)

OTHER PUBLICATIONS

Nov. 26, 2018 Search Report issued in European Patent Application No. 18197330.6.

(Continued)

*Primary Examiner* — Eric Hug
(74) *Attorney, Agent, or Firm* — Oliff PLC

(57) ABSTRACT

Provided is a sheet manufacturing apparatus capable of desirably adjusting the thickness of the sheet, and forming sheets with highly uniform thickness or grammage. A sheet manufacturing apparatus configured to make a sheet from defibrated material of defibrated paper includes: a drum unit having a cylinder with a defibrated material storage space inside and multiple openings through which the defibrated material passes formed in the outside of the cylinder; an accumulator configured to accumulate the defibrated material that past the openings, forming a deposit; and a housing configured to enclose the drum unit and the accumulator, the housing having a vent through which air passes between the drum unit and the accumulator.

13 Claims, 12 Drawing Sheets

(51) Int. Cl.
    *D04H 1/732*     (2012.01)
    *D21B 1/08*     (2006.01)
    *D21H 27/00*     (2006.01)

(56) References Cited

U.S. PATENT DOCUMENTS

| | | |
|---|---|---|
| 9,890,500 B2 | 2/2018 | Higuchi |
| 10,081,913 B2 | 9/2018 | Omagari et al. |
| 2016/0145802 A1 | 5/2016 | Higuchi |
| 2016/0145803 A1* | 5/2016 | Higuchi .................... D21F 1/60 162/357 |
| 2016/0273164 A1 | 9/2016 | Omagari et al. |
| 2017/0350073 A1 | 12/2017 | Omagari et al. |

FOREIGN PATENT DOCUMENTS

| | | |
|---|---|---|
| EP | 3070202 A1 | 9/2016 |
| EP | 3088584 A1 | 11/2016 |
| JP | H08-13376 A | 1/1996 |
| JP | 2000-234255 A | 8/2000 |
| JP | 2002-272782 A | 9/2002 |
| JP | 2006-132009 A | 5/2006 |
| JP | 2012-144819 A | 8/2012 |
| JP | 2017-13264 A | 1/2017 |

OTHER PUBLICATIONS

"New General Technology Series for Vocational Skills," Latest Technical Manual for Wood Processing and Volume Calculation, Inner Mongolia People's Publishing House, Jul. 16, 2020, 14 pages.
"Building Lightweight Boards," China Building Materials Press, Oct. 2005, 16 pages.

* cited by examiner

SHEET MANUFACTURING APPARATUS

BACKGROUND

1. Technical Field

The present invention relates to a sheet manufacturing apparatus.

2. Related Art

A sheet manufacturing apparatuses according to the related art use a slurry process in which feedstock including fiber is soaked in water, defibrated primarily by a mechanical action, and then rescreened. Sheet manufacturing apparatuses using such wet slurry methods require a large amount of water, and are large. Maintenance of the water processing system is also laborious, and the drying process requires much energy.

Dry process sheet manufacturing apparatuses that use little to no water have therefore been proposed to reduce equipment size and energy consumption. For example, JP-A-2012-144819 describes defibrating pieces of paper into fibers in a dry-process defibrator, deinking the fibers in a cyclone classifier, passing the deinked fiber through a foraminous screen in the surface of a forming drum, and laying the fiber on a mesh belt using the suction of a suction device to form paper.

However, when fiber is supplied by an air stream to the forming drum of the sheet manufacturing apparatus described above, the amount of fiber deposited on the mesh belt may become uneven when there are disruptions in the air stream, resulting in uneven grammage in the formed sheet. Another problem is that due to the suction of the suction device (suction unit), negative pressure may be produced in the housing surrounding the drum, increasing the amount of air suctioned from the gap between the mesh belt and the housing. As a result, the amount of fiber accumulated on the mesh belt becomes inconsistent, and the grammage of the manufactured sheet becomes inconsistent.

An object of the several aspects of the invention is to provide a sheet manufacturing apparatus that can desirably adjust the thickness of the manufactured sheet, including, for example, making sheets with a high degree of uniform thickness, or more specifically, uniform grammage.

SUMMARY

The present invention is directed to solving at least part of the foregoing problem, and can be embodied as described below.

A sheet manufacturing apparatus according to the invention configured to make a sheet from defibrated material of defibrated paper includes: a drum unit having a cylinder with a defibrated material storage space inside and multiple openings through which the defibrated material passes formed in the outside of the cylinder; an accumulator configured to accumulate the defibrated material that passes through the openings, forming a deposit; and a housing configured to enclose the drum unit and the accumulator, the housing having a vent through which air passes between the drum unit and the accumulator.

Preferably, the sheet manufacturing apparatus also has a suction unit configured to suction air between the drum unit and the accumulator.

Further preferably in a sheet manufacturing apparatus according to another aspect of the invention, the accumulator has a belt configured to convey the deposit; the belt has through-holes through the thickness of the belt; and the suction unit is disposed on the opposite side of the belt as the drum unit.

A sheet manufacturing apparatus according to another aspect of the invention preferably also has an injector configured to inject air through the vent to between the drum unit and the accumulator.

A sheet manufacturing apparatus according to another aspect of the invention preferably also has an adjustment device configured to adjust the size of the vent opening.

A sheet manufacturing apparatus according to another aspect of the invention preferably also has at least one seal disposed to the outside part of the drum unit of the process unit with an opening on the accumulator side.

A sheet manufacturing apparatus configured to make a sheet from defibrated material of defibrated paper according to another aspect of the invention includes: a drum unit having a cylinder with a defibrated material storage space inside and multiple openings through which the defibrated material passes formed in the outside of the cylinder;

an accumulator configured to accumulate the defibrated material that passes through the openings, forming a deposit; and multiple seals disposed circumferentially to the outside of the drum unit; wherein adjacent seals are configured to move circumferentially on the outside of the drum unit to or away from each other.

A sheet manufacturing apparatus according to another aspect of the invention preferably also has a detector configured to detect a thickness of the deposit or a thickness of the sheet.

A sheet manufacturing apparatus according to another aspect of the invention preferably also has a controller configured to change a formation condition of the deposit based on a detection result of the detector.

A sheet manufacturing apparatus according to another aspect of the invention preferably also has an air current rectifier disposed to the housing.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

Embodiment 1

Figure 1:
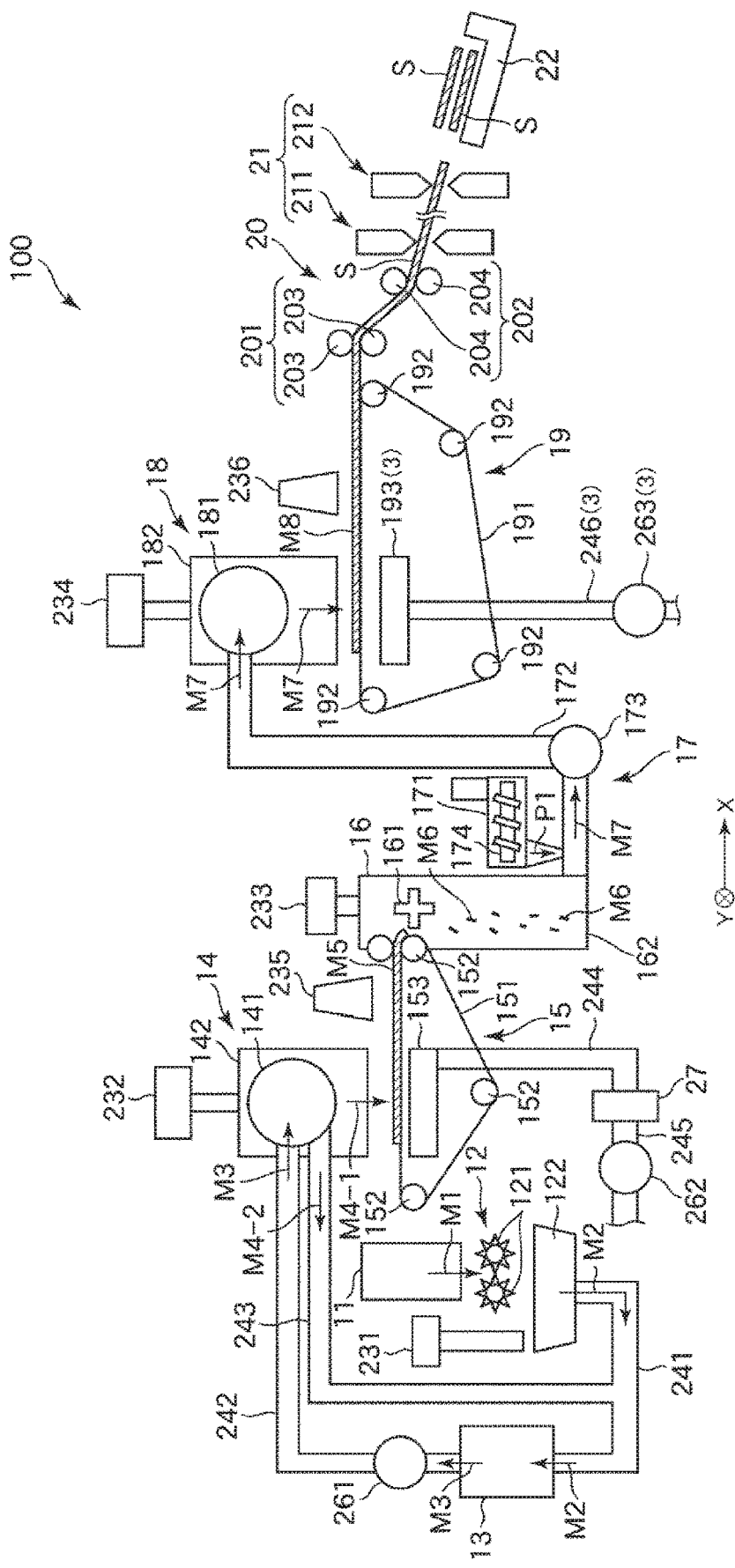
FIG. 1 is a schematic side view of a sheet manufacturing apparatus according to the invention (first embodiment).
Figure 2:
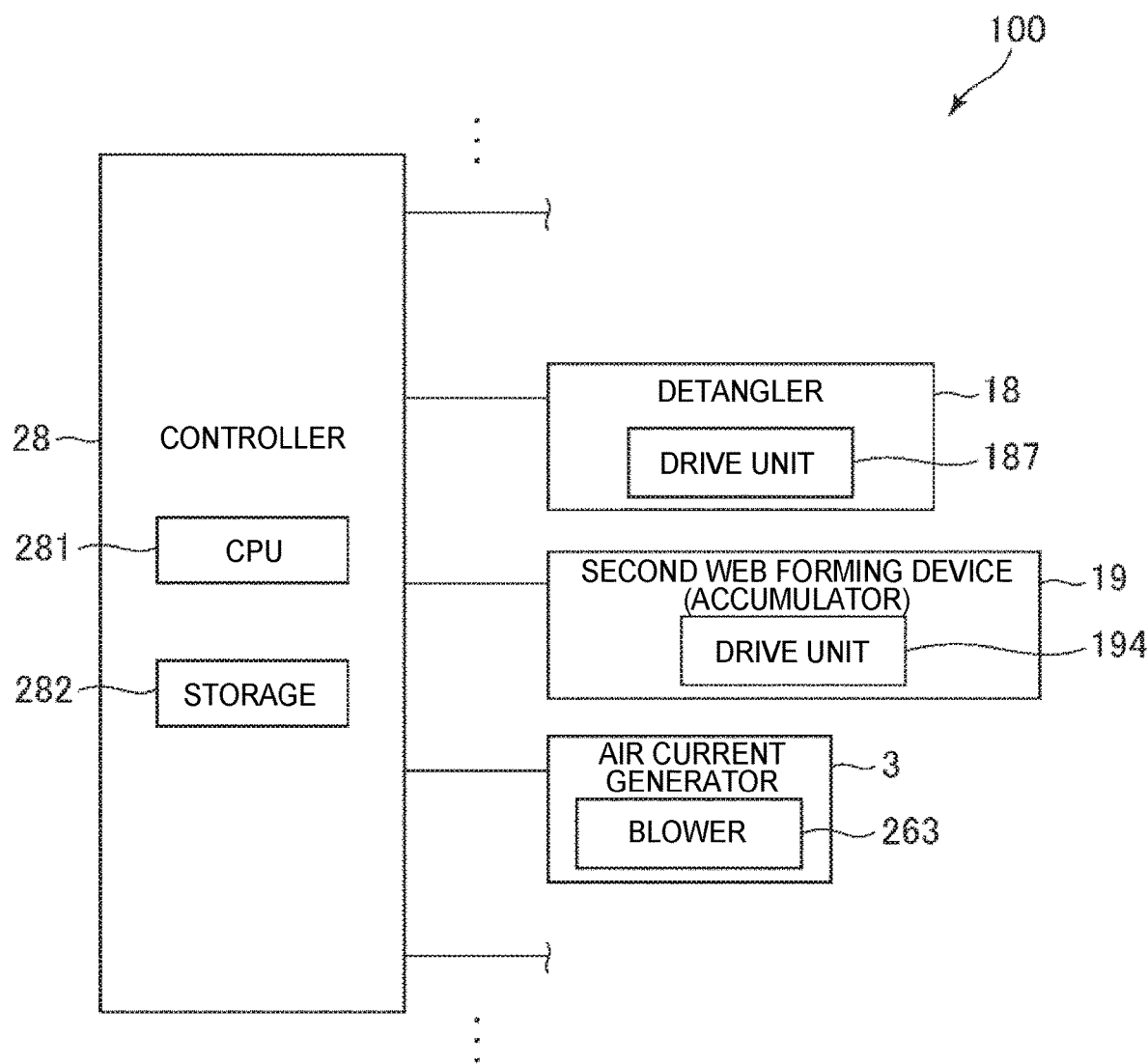
FIG. 2 is a block diagram of the main parts of the sheet manufacturing apparatus shown in FIG. 1.
Figure 3:
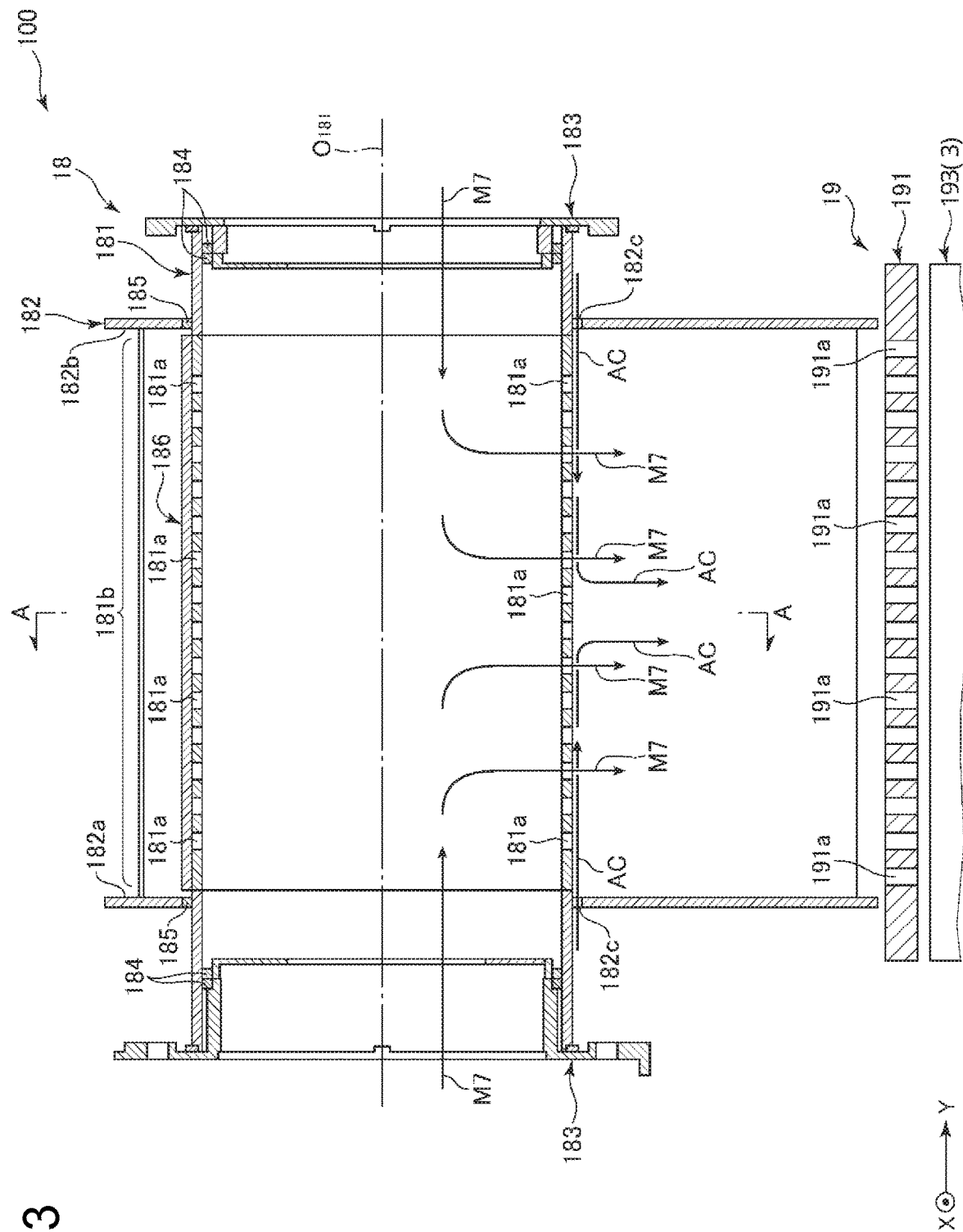
FIG. 3 is a vertical section view from the downstream side of the detangler and second web forming device of the sheet manufacturing apparatus shown in FIG. 1.
Figure 4:
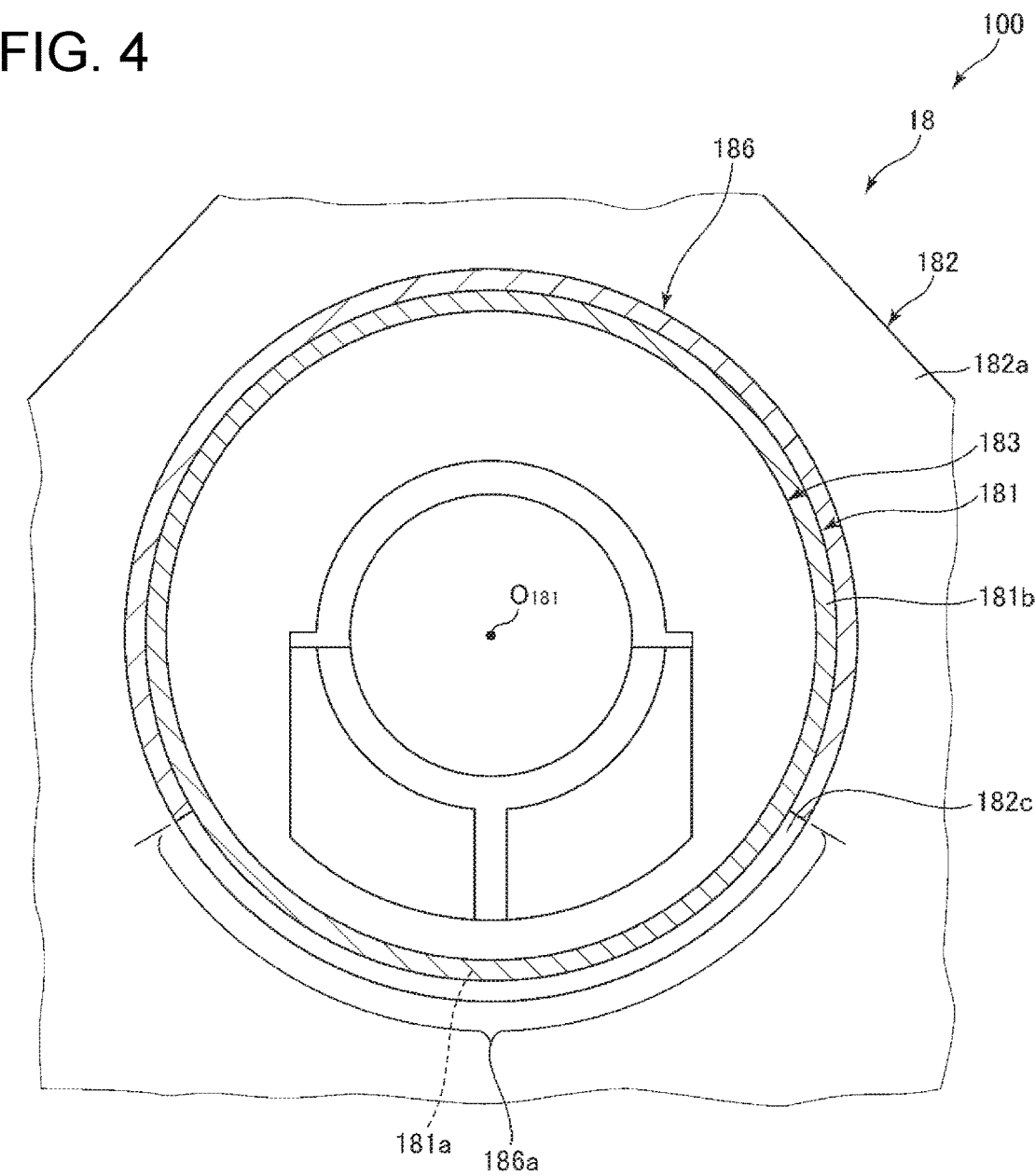
FIG. 4 is a section view through line A-A in FIG. 3.
Figure 5:
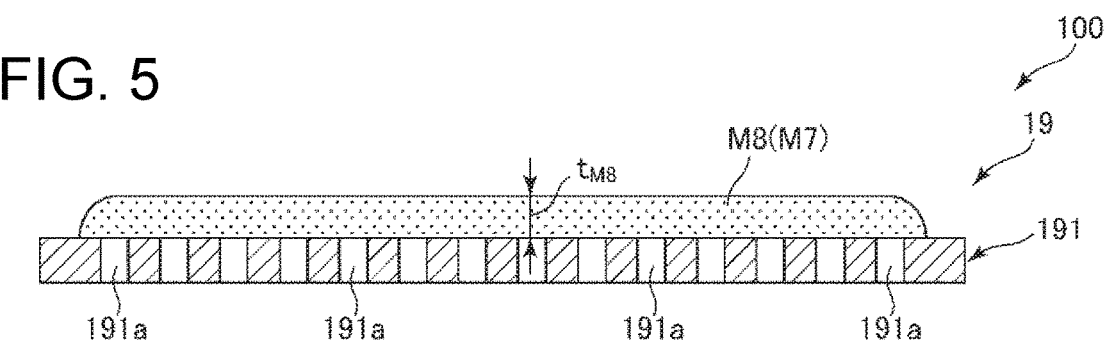
FIG. 5 is a vertical section view of one example of a second web laid on the mesh belt of the second web forming device shown in FIG. 3.
Figure 6:
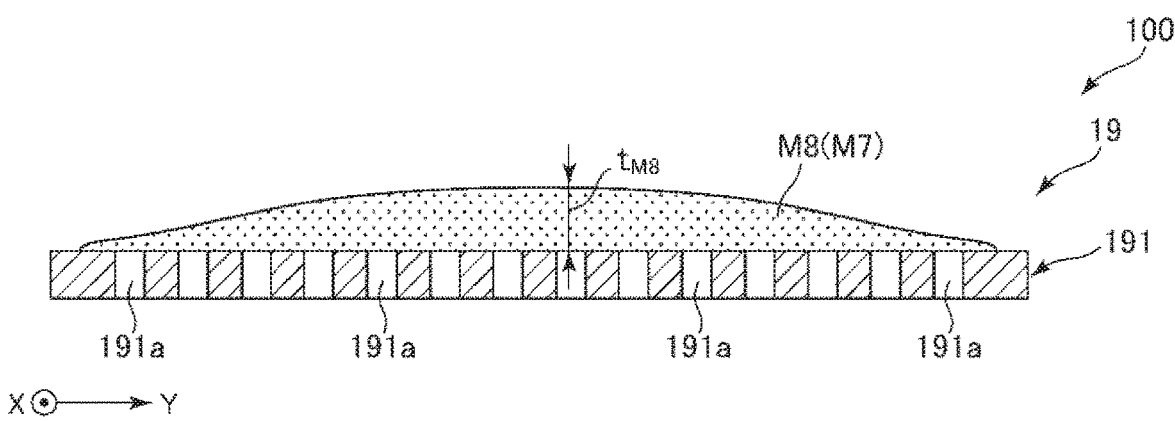
FIG. 6 is a vertical section view of one example of a second web laid on the mesh belt of the second web forming device shown in FIG. 3.
Figure 7:
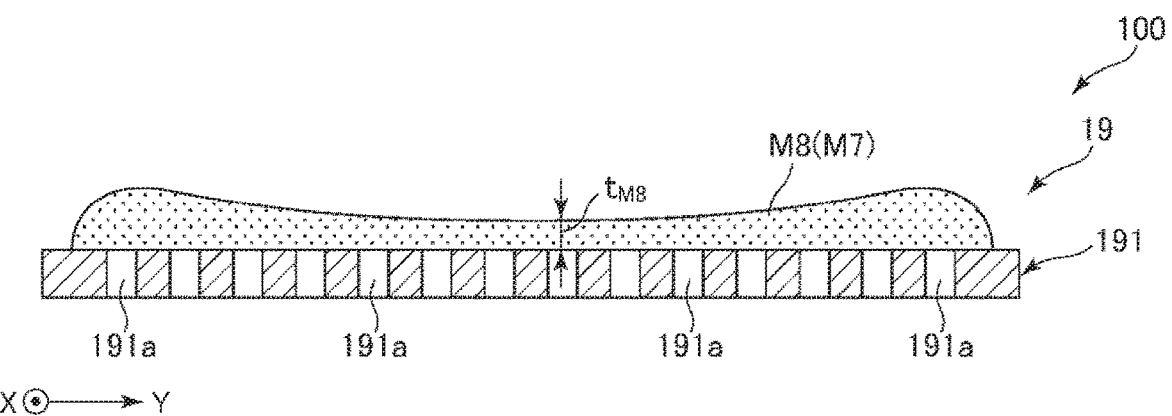
FIG. 7 is a vertical section view of one example of a second web laid on the mesh belt of the second web forming device shown in FIG. 3.

FIG. 1 is a schematic side view of a sheet manufacturing apparatus according to the invention (first embodiment). FIG. 2 is a block diagram of the main parts of the sheet manufacturing apparatus shown in FIG. 1. FIG. 3 is a vertical section view from the downstream side of the detangler and second web forming device of the sheet manufacturing apparatus shown in FIG. 1. FIG. 4 is a section view through line A-A in FIG. 3. FIG. 5 to FIG. 7 are vertical section views of one example of a second web laid on the mesh belt of the second web forming device shown in FIG. 3.

Note that for convenience below, the top as seen in FIG. 1 and FIG. 3 to FIG. 7 (and in FIG. 8 to FIG. 12, and FIG. 14 and FIG. 15) is referred to as the top or above, and the bottom as the bottom or below. The left side in FIG. 1 (and in FIG. 12 and FIG. 13) is referred to as the left or upstream side, and the right as the right or downstream side. As also shown in FIG. 1, the left-right direction in the figure is also referred to as the X-axis, and the direction perpendicular to the surface of the page as the Y-axis. This also applies to the other figures.

The sheet manufacturing apparatus 100 shown in FIG. 1 is a system for manufacturing sheets S from defibrated material M3 defibrated from paper shreds M2. The sheet manufacturing apparatus 100 has a detangler 18 (process unit), second web forming device 19 (also referred to as an air-laying device or accumulator), and air current generator 3.

The detangler 18 has a cylindrical, foraminous drum 181 with an internal space for holding the defibrated material M3, and openings 181a through which the defibrated material M3 passes formed in the outside surface of the cylinder.

The second web forming device 19 is outside the drum 181, and accumulates defibrated material M3 that passes through the openings 181a, forming a second web M8 (deposit).

The air current generator 3 creates an air current AC from the drum 181 through the second web forming device 19 (accumulator).

By controlling the air current AC produced by the air current generator 3, the sheet manufacturing apparatus 100 can adjust the accumulation of second web M8 (deposit), or more specifically can adjust the distribution of the thickness $t_{M8}$ of the second web M8.

In the embodiment described herein, the detangler 18 is an example of a process unit, and the second web forming device 19 is an example of an accumulator, but the invention is not so limited. For example, the process unit may be the classifier 14, and the accumulator may be the first web forming device 15.

In the invention thus comprised, as described below, when the drum 181 turns, a current of air is produced by rotation of the drum 181, but this current can be limited to the extent enabled by the air current AC produced by the air current generator 3. As a result, the effect of the air current produced by said rotation (disturbance of the defibrated material M3 when descending from the drum 181) can be suppressed or prevented. As a result, the second web M8 can be processed to a desirable accumulation, enabling laying a second web M8 with a uniform thickness $t_{M8}$ across the width of the mesh belt 191 (across the Y-axis) as shown in FIG. 5, for example. The sheet S then made from this second web M8 can thus be controlled to a desirable thickness, and more particularly to a uniform thickness.

As shown in FIG. 1, the sheet manufacturing apparatus 100 has, on the downstream side, a feedstock supply device 11, a shredder 12, a defibrator 13, a classifier 14, a first web forming device 15, a cutter 16, a mixing device 17, a detangler 18, a second web forming device 19, a sheet forming device 20, a paper cutter 21, a stacker 22, and a dust collector 27. The sheet manufacturing apparatus 100 also has wetting unit 231, wetting unit 232, wetting unit 233, wetting unit 234, wetting unit 235, and wetting unit 236. The sheet manufacturing apparatus 100 also has a blower 261, blower 261, and blower 263 (air current generator 3).

As shown in FIG. 2, various parts of the sheet manufacturing apparatus 100 (including the detangler 18, second web forming device 19, and air current generator 3) are connected to a controller 28, which controls their operation. The controller 28 includes a CPU (central processing unit) CPU 281 and storage 282. The CPU 281 can make decisions and execute commands, for example. The storage 282 stores programs, such as a program for manufacturing sheets S. The controller 28 may be built into the sheet manufacturing apparatus 100, or disposed to an external device such as an externally connected computer.

The external device may connect to and communicate with the sheet manufacturing apparatus 100 through a cable or wirelessly, or connect to the sheet manufacturing apparatus 100 through a network (including the Internet). The CPU 281 and storage 282 may be integrated into a single device, or the CPU 281 may be integrated into the sheet manufacturing apparatus 100 with the storage 282 connected to an external computer or other device, or the storage 282 may be integrated into the sheet manufacturing apparatus 100 with the CPU 281 disposed to an external computer or other device.

The sheet manufacturing apparatus 100 executes, in order, a feedstock supply process, a shredding process, a defibrating process, a classification process, a first web forming process, a cutting process, a mixing process, a detangling process, a second web forming process, a sheet forming process, and a sheet cutting process.

The configuration of parts of the sheet manufacturing apparatus 100 is described below.

The feedstock supply device 11 is the part that executes the feedstock supply process supplying feedstock M1 (substrate) to the shredder 12. The feedstock M1 is sheet material containing fiber (cellulose fiber).

Note that the cellulose fiber may be any fibrous material containing mainly cellulose (narrowly defined cellulose) as a compound, and in addition to cellulose (narrowly defined cellulose) may include hemicellulose or lignin. The form of the feedstock M1 is not specifically limited, and the feedstock M1 may be woven cloth or non-woven cloth. The feedstock M1 may also be recycled paper manufactured (regenerated) by defibrating recovered paper, or synthetic Yupo Paper®.

The shredder 12 is the part that executes the shredding process of shredding the feedstock M1 supplied from the feedstock supply device 11 in air (ambient air). The shredder 12 has a pair of shredder blades 121 and a chute (hopper) 122.

By turning in mutually opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can catch the shreds M2 that are shredded and dropped by the shredder blades 121.

Above the chute 122, a wetting unit 231 is disposed beside the pair of shredder blades 121. The wetting unit 231 wets the shreds M2 in the chute 122. This wetting unit 231 has a filter (not shown in the figure) containing water, and is configured as a heaterless humidifier (or heated humidifier) that supplies a moist stream of air to the shreds M2 by passing air through the filter. By supplying humidified air to the shreds M2, shreds M2 sticking to the chute 122 due to static electricity can be suppressed.

The chute 122 connects to the defibrator 13 through a conduit (flow channel) 241. The shreds M2 collected in the chute 122 passes through the conduit 241 and are conveyed to the defibrator 13.

The defibrator 13 is the part that executes the defibrating process that defibrates the shreds M2 in air, or more specifically in a dry process. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

The defibrator 13 in this embodiment of the invention, for example, is configured as an impeller mill having a rotor that turns at high speed, and a liner disposed around the rotor. Shreds M2 introduced to the defibrator 13 are caught between the rotor and the liner and defibrated.

The defibrator 13, by rotation of the rotor, produces an air flow (current) from the shredder 12 to the classifier 14. As a result, shreds M2 can be suctioned from the conduit 241 to the defibrator 13. In addition, after the defibration process, the defibrated material M3 can be fed through another conduit 242 to the classifier 14.

A blower 261 is disposed in the conduit 242. The blower 261 is an air current generator that produces a flow of air to the classifier 14. Conveyance of the defibrated material M3 to the classifier 14 is thereby promoted.

The classifier 14 is the part that executes the classification process of classifying the defibrated material M3 based on the length of the fibers. In the classifier 14, the defibrated material M3 is separated into first screened material M4-1, and second screened material M4-2 that is larger than the first screened material M4-1.

The first screened material M4-1 is of a size appropriate to manufacturing sheets S downstream.

The average length of the fibers is preferably greater than or equal to 100 μm and less than or equal to 10 mm.

The second screened material M4-2 may also include, for example, fiber that has not been sufficiently defibrated, and excessively agglomerated (clumped) defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit (flow path) 243 connected to the drum 141. The end of the conduit 243 on the opposite end (downstream end) as the drum 141 is connected to another conduit 241. The second screened material M4-2 that passes through the conduit 243 merges with the shreds M2 inside the conduit 241, and is introduced with the shreds M2 to the defibrator 13. As a result, the second screened material M4-2 is returned to the defibrator 13 and again passes through the defibrating process with the shreds M2.

The first screened material M4-1 from the drum 141 is dispersed while dropping through air, and descends toward the first web forming device 15 (separator). The first web forming device 15 is the part that executes a first web forming process (see FIG. 5) forming a first web M5 from the first screened material M4-1. The first web forming device 15 includes a mesh belt (separation belt) 151, three tension rollers 152, and a suction unit (suction mechanism) 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screened material M4-1 may also contain dust and dirt and other material. Dust and dirt, for example, may be produced by shredding and defibration. Such dust and dirt is later recovered in the dust collector 27 described below.

The suction unit 153 suctions air from below the mesh belt 151. As a result, dust and dirt that has passed through the mesh belt 151 can be suctioned together with the air.

The suction unit 153 is connected to a dust collector 27 through another conduit (flow path) 244. Dust and dirt suctioned by the suction unit 153 is captured by the dust collector 27.

Another conduit (flow path) 245 is also connected to the storage hopper 27. A blower 262 is connected to the conduit 245. Operation of the blower 262 produces suction in the suction unit 153. This promotes formation of the first web M5 on the mesh belt 151. Dust and dirt has been removed from the material forming the first web M5. Operation of the blower 262 causes the dust and dirt to pass through the conduit 244 and reach the dust collector 27.

The housing 142 is connected to a wetting unit 232. Like the wetting unit 231 described above, the wetting unit 232 is a heaterless humidifier. As a result, humidified air is supplied into the housing 142. This wet air moistens the first screened material M4-1, and as a result can suppress sticking of the first screened material M4-1 to the inside walls of the housing 142 due to static electricity.

Another wetting unit 235 is disposed downstream from the classifier 14. This wetting unit 235 is configured as an ultrasonic humidifier that mists water. As a result, moisture can be supplied to the first web M5, and the moisture content of the first web M5 can thereby be adjusted. This adjustment can also suppress sticking of the first web M5 to the mesh belt 151 due to static electricity. As a result, the first web M5 easily separates from the mesh belt 151 at the tension roller 152 from where the mesh belt 151 returns to the upstream side.

On the downstream side of the wetting unit 235 is a cutter 16. The cutter 16 is a part that executes a cutting process of cutting the first web M5 that has separated from the mesh belt 151.

The cutter 16 has a propeller 161 that is rotationally supported, and a housing 162 that houses the propeller 161. The first web M5 is cut into pieces as it is fed into the rotating propeller 161. The cut first web M5 is thus processed into fragments M6. The fragments M6 then drop down in the housing 162.

The housing 162 is connected to another wetting unit 233. Like wetting unit 231 described above, wetting unit 233 is a heaterless humidifier. As a result, humidified air is supplied into the housing 162. This wet air suppresses sticking of the fragments M6 to the propeller 161 and to the inside walls of the housing 162 due to static electricity.

A mixing device 17 is disposed on the downstream side of the cutter 16. The mixing device 17 is the part that executes a mixing process of mixing the fragments M6 with resin P1. The mixing device 17 includes a resin supply device 171, a conduit (flow path) 172, and a blower 173.

The conduit 172 connects the cutter 16 to the detangler 18, and is a flow path through which a mixture M7 of the fragments M6 and resin P1 passes.

The resin supply device 171 connects to the conduit 172. The resin supply device 171 has a screw feeder 174. By rotationally driving the screw feeder 174, the resin P1 can be supplied in powder or particle form to the conduit 172. The resin P1 supplied to the conduit 172 is mixed with the fragments M6, forming the mixture M7.

Note that the resin P1 bonds fibers together in a downstream process, and may be a thermoplastic resin or a thermosetting resin, but is preferably a thermoplastic resin. Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P1 may also be supplied from the resin supply device 171, including, for example, coloring agents for adding color to the fiber, anti-blocking agents for suppressing clumping of the fiber and clumping of the resin P1, flame retardants for making the fiber and manufactured sheets difficult to burn, and paper strengtheners for increasing the strength of the sheet S. Compounds already incorporating such other additives with the resin P1 may also be supplied.

The blower 173 is disposed to the conduit 172 downstream from the resin supply device 171. The fragments M6 and resin P1 are also mixed by the action of a rotating unit such as blades of the blower 173. The blower 173 is configured to produce an air current toward the detangler 18. This air current can also mix the fragments M6 and resin P1 inside the conduit 172. As a result, the mixture M7 can be introduced to the detangler 18 as a uniform dispersion of the fragments M6 and resin P1. The fragments M6 in the mixture M7 are further detangled into smaller fibers while travelling through the conduit 172.

The detangler 18 is the part that executes the detangling process that detangles interlocked fibers in the mixture M7.

The detangler 18 includes a drum 181 and a housing 182 that houses the drum 181.

The drum 181 is a sieve comprising a cylindrical mesh body that rotates on its center axis $O_{181}$. The mixture M7 is introduced to the drum 181. By the drum 181 rotating, fiber in the mixture M7 that is smaller than the mesh can pass through the drum 181. The mixture M7 is detangled in this process.

Note that the detangler 18 is described in detail below.

The mixture M7 that is detangled in the drum 181 is dispersed while dropping through air, and falls to the second web forming device 19 located below the drum 181. The second web forming device 19 is the part that executes the second web forming process forming a second web M8 from the mixture M7. The second web forming device 19 includes a mesh belt (separation belt) 191, tension rollers 192, and a suction unit (suction mechanism) 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The tension rollers 192 are connected to a drive unit 194 including a drive source such as a motor and a transmission, and the tension rollers 192 can be driven at a specific speed of rotation by operation of the drive unit 194. Operation of the drive unit 194 is controlled by the controller 28 (see FIG. 2), and the speed of the tension rollers 192 can be varied (set to multiple levels).

The suction unit 193 suctions air down from below the mesh belt 191. As a result, the mixture M7 can be pulled onto the mesh belt 191, and accumulation of the mixture M7 on the mesh belt 191 is thereby promoted.

Another conduit (flow path) 246 is connected to the suction unit 193. A blower 263 is also disposed to the conduit 246. Operation of the blower 263 produces suction in the suction unit 193. Operation of the blower 263 is controlled by the controller 28 (see FIG. 2).

Another wetting unit 234 is connected to the housing 182. Like the wetting unit 231 described above, wetting unit 234 is a heaterless humidifier. As a result, humidified air is supplied into the housing 182. By humidifying the inside of the housing 182 by adding wet air, sticking of the mixture M7 to the inside walls of the housing 182 due to static electricity can be suppressed.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. This adjustment can also suppress sticking of the second web M8 to the mesh belt 191 due to static electricity. As a result, the second web M8 easily separates from the mesh belt 191 at the tension roller 192 from where the mesh belt 191 returns to the upstream side.

Note that the amount of moisture (total moisture content) added by wetting unit 231 to wetting unit 236 is, for example, preferably greater than or equal to 0.5 parts by weight and less than or equal to 20 parts by weight per 100 parts by weight of the material before adding water.

A sheet forming device 20 is disposed downstream from the second web forming device 19. The sheet forming device 20 is the part that executes the sheet forming process forming sheets S from the second web M8. This sheet forming device 20 includes a calender 201 and a heater 202.

The calender 201 comprises a pair of calender rolls 203, and the second web M8 can be compressed without heating (without melting the resin P1) by passing the second web M8 between the calender rolls 203. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 passing between the heat rollers 204. The combination of heat and pressure melts the resin P1 in the second web M8, and bonds fibers through the molten resin P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

A paper cutter 21 is disposed downstream from the sheet forming device 20. The paper cutter 21 is the part that executes the sheet cutting process (see FIG. 5) that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

Sheets S of a desired size are produced by the cutting action of the first cutter 211 and the second cutter 212. The sheets S are then conveyed further downstream and stacked in a stacker 22.

However, when forming the second web M8 on the mesh belt 191 of the second web forming device 19, it may be desirable to form the second web M8 in shapes such as shown in FIG. 5 to FIG. 7.

The second web M8 shown in FIG. 5 has a uniform thickness $t_{M8}$. A sheet S produced from this second web M8 also has a uniform thickness and uniform strength (paper strength) throughout.

The thickness $t_{M8}$ of the second web M8 shown in FIG. 6 is greatest in the center of the width of the mesh belt 191 (between left and right in the figure), and gradually narrows to the sides (the left side and right side in the figure). A sheet S made from this second web M8 has the greatest fiber density and strength (paper strength) in the middle.

The thickness $t_{M8}$ of the second web M8 shown in FIG. 7 is smallest in the center of the width of the mesh belt 191 (between left and right in the figure), and gradually increases to the sides (the left side and right side in the figure). A sheet S made from this second web M8 has the greatest fiber density and strength (paper strength) at the left and right sides.

The sheet manufacturing apparatus 100 according to this embodiment enables adjusting the thickness $t_{M8}$ to create these various forms. The configuration and operation enabling this is described below.

As described above, the detangler 18 is the part that executes the detangling process of detangling the mixture M7, which is a mixture of fragments M6 (defibrated material M3) and resin P1. The process unit in this embodiment thus functions as a detangler 18 that detangles the mixture M7 (defibrated material M3). This process breaks up entangled clumps of mixture M7 so that the mixture M7 is dispersed evenly in air and descends in the housing 182, and accumulates on the mesh belt 191 of the second web forming device 19.

As described above, the detangler 18 includes a drum 181, and a housing 182 that encloses the drum 181.

As shown in FIG. 3 and FIG. 4, the drum 181 is a cylindrical sieve. There is a space for temporarily holding the mixture M7 (defibrated material M3) inside the drum 181 (sieve).

The drum 181 is connected to a drive unit 187 including a drive source such as a motor and a transmission, and the drum 181 can be driven at a specific speed of rotation on the center axis $O_{181}$ of the drum 181 by operation of the drive unit 187. Operation of the drive unit 187 is controlled by the controller 28 (see FIG. 2), and the speed of the drum 181 can be varied (set to multiple levels).

Multiple openings 181a are formed passing through the wall of the drum along the center axis $O_{181}$. Each of the openings 181a opens to the outside of the drum 181 (sieve). When the drum 181 turns on the center axis $O_{181}$, the mixture M7 (defibrated material M3) inside the drum 181 can pass down to the outside from the openings 181a that are below the height of the center axis $O_{181}$. When the mixture M7 inside the drum 181 rotates with the drum 181, the mixture M7 is smoothly and desirably detangled by passing through the openings 181a.

Note that the shape of the openings 181a in plan view is not specifically limited, and may be round, elliptical, or polygonal. The size of the openings 181a in plan view is not specifically limited, and when the openings 181a are round, the diameter is preferably greater than or equal to 0.5 mm and less than or equal to 5 mm, and further preferably greater than or equal to 1 mm and less than or equal to 3 mm.

The method of forming the openings 181a is also not specifically limited, and the openings 181a may be formed by stamping or other mechanical process. The mechanical process may also include laser cutting or etching. The drum 181 may also use a plastic screen, metal screen, or expanded metal.

As shown in FIG. 3, an inlet port 183 through which mixture M7 is input is connected to each end of the drum 181. The inlet ports 183 may be annular or cylindrical, and are inserted to the inside side of the ends of the drum 181. The inlet ports 183 also communicate with the upstream end of conduit 172. As a result, the mixture M7 passing through the conduit 172 can be introduced through the inlet ports 183 to the drum 181.

Between the drum 181 and the inlet ports 183 is a ring-shaped, flexible seal (pile seal) 184. As a result, the drum 181 and inlet ports 183 are connected by an air-tight seal, and mixture M7 can be prevented from leaking through the connection. Note that two seals 184 are provided on each inlet port 183 side in the configuration shown in FIG. 3, but the invention is not so limited and there may be only one or three or more.

The detangler 18 has a housing 182 that holds the drum 181 rotationally on the center axis $O_{181}$. As shown in FIG. 3, the housing 182 has a left wall 182a located on the left side in the view in FIG. 3, and a right wall 182b located on the right side in the figure. In other words, the housing 182 is shaped like a box with an opposing left wall 182a and right wall 182b on the left and right sides as seen in the figure. The left end of the drum 181 passes through the left wall 182a, and the right end of the drum 181 passes through the right wall 182b.

A seal (pile seal) 185 is disposed between the left wall 182a and the outside of the drum 181, and the right wall 182b and the outside of the drum 181. Each seal 185 is made from an elongated flexible or pile seal member, and is disposed circumferentially to the outside of the drum 181. An air-tight seal can therefore be made between the left wall 182a and the outside of the drum 181, and between the right wall 182b and the outside of the drum 181, and the mixture M7 can therefore be prevented from leaking from these gaps. Note that one seal 185 is provided on the left wall 182a and right wall 182b in the configuration shown in FIG. 3, but the invention is not so limited and there may be two or more.

The bottom of the housing 182 is open to the mesh belt 191. As a result, the mixture M7 that passes through the openings 181a in the drum 181 precipitates and accumulates on the mesh belt 191.

Note that a seal (not shown in the figure) is preferably disposed between the bottom of the housing 182 and the mesh belt 191. This can prevent the mixture M7 from leaking from the gap between the housing 182 and the mesh belt 191.

As shown in FIG. 3 and FIG. 4, in addition to the drum 181 and housing 182, the detangler 18 (process unit) has at least one seal (one in this embodiment) seal 186 that is disposed to the outside of the drum 181 and opens to the mesh belt 191 of the second web forming device 19.

The seal 186 is a flexible (elastic) seal. This seal 186 covers the outside surface of the drum 181 in the area outside the openings formation area 181b where the multiple openings 181a are formed, that is, covers the outside of the cylinder where the openings 181a are not formed. The seal 186 also has an open area 186a on the bottom of the drum 181 (see FIG. 4). The open area 186a communicates with the inside of the drum 181. By providing this seal 186, when the drum 181 turns, air from outside the housing 182 can be suctioned through the open area 186a to rectify the air flow of the rotating drum 181, and defibrated material inside the drum from can be prevented from leaking to the outside of the housing 182 from the area where the seal 186 is provided.

Note that one seal 186 is provided in this example, but the invention is not so limited and there may be two or more.

The seal 186 is configured separately from seal 185, but the invention is not so limited and the seal 186 may be integrated with seal 185.

The material of the seal 186 is not specifically limited, and may be any one or a blend of any two or more rubbers (particularly vulcanized rubbers) such as urethane rubber, silicone rubber, or fluoro rubber; or thermoplastic elastomers such as styrene-based, polyolefin-based, polyvinyl chloride-based, polyurethane-based, polyester-based, polyimide-based, polybutadiene-based, trans polyisoprene-based, fluoro rubber-based, or chlorinated polyethylene-based.

A pile seal used as the seal 186 may be a high density weave of nylon, acrylic, or polyester fibers, felt or other layered fiber member, or other compressible material with good sliding properties.

As shown in FIG. 3, the second web forming device 19 (accumulator) is disposed below (outside) the drum 181. The second web forming device 19 (accumulator) is the part on which mixture M7 (defibrated material M3) that passes through the openings 181a of the drum 181 accumulates. The mixture M7 that accumulates on the second web forming device 19 and becomes a layered second web M8.

As described above, the second web forming device 19 (accumulator) has a mesh belt 191 (belt) on which the second web M8 (deposit) accumulates, and which conveys the second web M8.

FIG. 3 and FIG. 5 to FIG. 7, the mesh belt 191 (belt) has multiple through-holes 191a formed through the thickness of the belt. Note that the shape of the through-holes 191a in plan view is not specifically limited, and may be round, elliptical, or polygonal. The size of the through-holes 191a in plan view is not specifically limited, and when the through-holes 191a are round, the diameter is preferably greater than or equal to 0.02 mm and less than or equal to 2 mm, and further preferably greater than or equal to 0.05 mm and less than or equal to 1 mm.

The method of forming the through-holes 191a is also not specifically limited, and the through-holes 191a may be formed by stamping or other mechanical process. The mechanical process may also include laser cutting or etching. The mesh belt 191 may also use a plastic screen, metal screen, or expanded metal.

As shown in FIG. 3, an air current AC is formed between the drum 181 of the detangler 18, and the mesh belt 191 of the second web forming device 19 (accumulator) by the air current generator 3.

In this embodiment of the invention, the air current generator 3 is configured with a suction unit 193 that pulls air from between the drum 181 and mesh belt 191 (accumulator) and creates the air current AC. The air current generator 3 includes, in addition to the suction unit 193, a conduit 246 and blower 263 (see FIG. 1).

As described above, the suction unit 193 suctions the mixture M7 onto the mesh belt 191 by the suction force created by the suction unit 193, and promotes accumulation of the mixture M7 onto the mesh belt 191. By the air current generator 3 having this suction unit 193, the need to provide a means other than the suction unit 193 to create the air current AC is eliminated, and the configuration of the sheet manufacturing apparatus 100 can be simplified.

As described above, the second web forming device 19 (accumulator) has a mesh belt 191 (belt) that conveys the second web M8. Numerous through-holes 191a passing through the thickness direction are formed in this mesh belt 191 (belt). As shown in FIG. 3, the suction unit 193 is disposed on the opposite side of the mesh belt 191 (belt) as the drum 181.

As also described above, the detangler 18 (process unit) has a housing 182 that holds a drum 181 rotationally around the center axis $O_{181}$ of the cylindrical body of the drum 181. As shown in FIG. 3, the housing 182 has a vent 182c through which air flows in the direction between the drum 181 and the mesh belt 191 (accumulator). A vent 182c is formed at both the left wall 182a and right wall 182b. The vent 182c at the left wall 182a is a gap between the left wall 182a and the drum 181. The vent 182c at the right wall 182b is a gap between the right wall 182b and the drum 181.

As shown in FIG. 4, the vent 182c curves along the outside of the drum 181. The vent 182c also overlaps the open area 186a of the seal 186.

This configuration promotes formation of an air current AC, and the air current AC flows in the direction of the arrows shown in FIG. 3. More specifically, the air current AC from the left wall 182a and the air current AC from the right wall 182b flow in opposite directions to the inside.

The relationship between formation of the air current AC by the air current generator 3, and adjusting the accumulation (distribution of the thickness $t_{M8}$) of the second web M8, is described next. Note that the average thickness of the second web M8 is determined in the sheet manufacturing apparatus 100 by the supply of mixture M7 to the mesh belt 191, and the conveyance speed of the mesh belt 191, but the accumulation of the second web M8 can be adjusted by the air current AC.

When the drum 181 turns, rotation of the drum 181 produces a current of air. This air current includes air that is discharged with the mixture M7 from the openings 181a, that is, flows from the center axis $O_{181}$ of the drum 181 toward the openings 181a, and air that flows circumferentially around the outside of the drum 181. This air may also affect the precipitation of mixture M7 discharged from the drum 181, and interfere with formation of the second web M8 (mixture M7) in a desirable state on the mesh belt 191.

However, the air current AC from the vents 182c can substantially counteract (cancel) this disruptive flow of air, and thereby suppress or prevent the effects of this disruptive air flow (such as turbulence in the falling mixture M7). As a result, the air current AC contributes to the formation of the second web M8 in a desirable state, such as a second web M8 with uniform thickness $t_{M8}$ as shown in FIG. 5). The manufactured sheet S can also be adjusted to the desired thickness.

The suction of the suction unit 193 can also be adjusted by the operating conditions of the blower 263, for example. As a result, the size of the air current AC can be adjusted. This enables adjusting where the mixture M7 accumulates on the mesh belt 191. This is described with reference to a configuration in which the size of the air current AC can be adjusted in three levels, Strong, Moderate, and Weak. The air current AC can be adjusted to the desired level by the controller 28 controlling the blower 263.

When the air current AC is set to Strong, the air current AC works to focus wind power (pressure) on the second web M8 in the area in the middle of the width (Y-axis in FIG. 3) of the mesh belt 191. As a result, the second web M8 accumulates as illustrated in FIG. 7.

However, when the air current AC is set to Weak, the air current AC works to focus wind power (pressure) on the second web M8 along the edges, that is, away from the middle, of the width (Y-axis in FIG. 3) of the mesh belt 191. As a result, the second web M8 accumulates as illustrated in FIG. 6.

When the air current AC is set to Moderate, the second web M8 accumulates in a condition between the state shown in FIG. 6 and the state shown in FIG. 7, that is, accumulates as shown in FIG. 5.

The air current AC can also suppress or prevent the mixture M7 from sticking to the inside of the housing 182 (such as to the left wall 182a and right wall 182b). As a result, the mixture M7 can be used without waste for the production of sheets S.

Note that an intake other than inlet port 183 may also be provided from introducing air to the inside of the drum 181.

A sheet manufacturing apparatus 100 configured as described above can therefore desirably adjust the thickness of the second web M8 by the formation of an air current AC by the air current generator 3.

Embodiment 2

Figure 8:
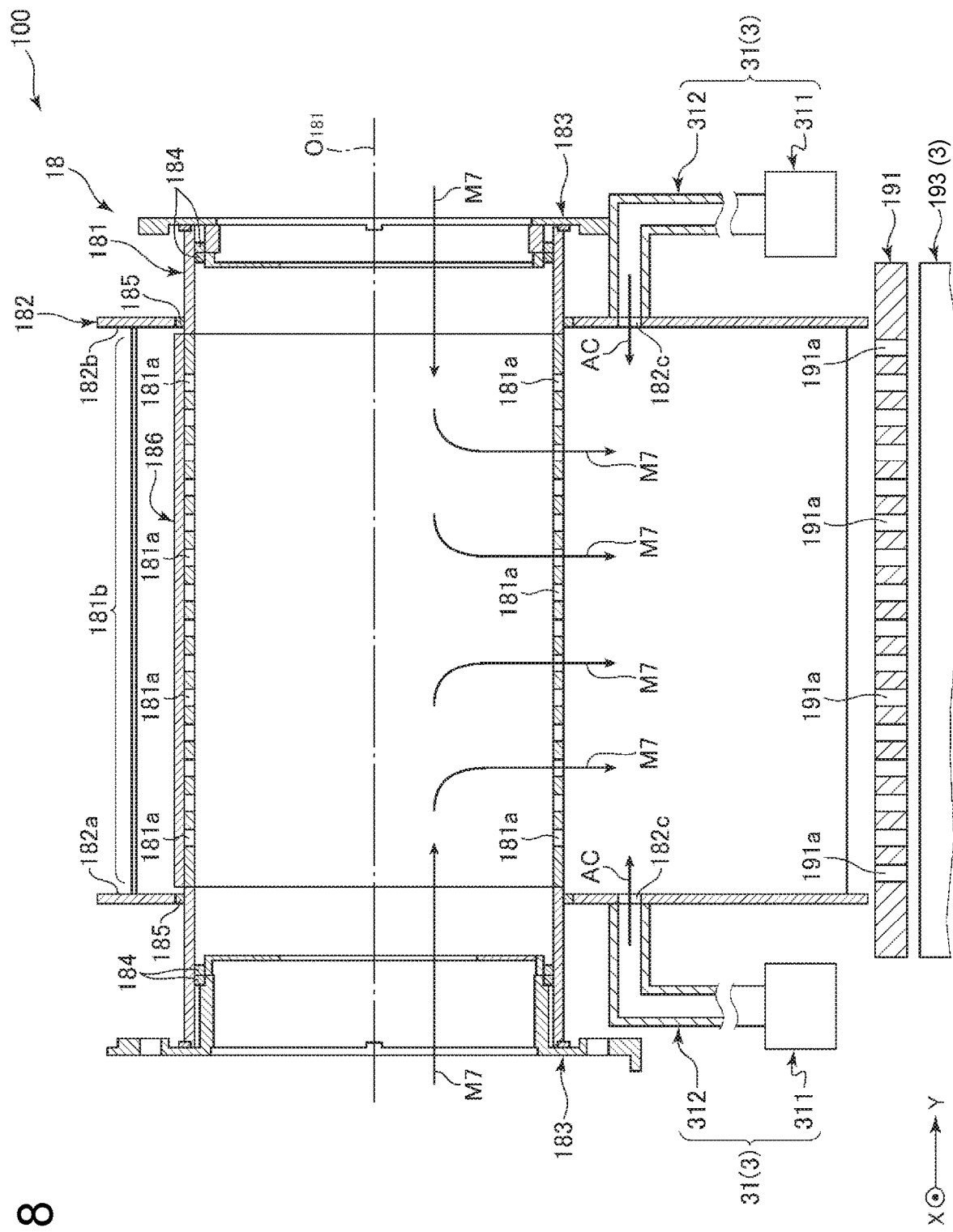
FIG. 8 is a vertical section view from the downstream side of the detangler and surroundings of a sheet manufacturing apparatus according to a second embodiment of the invention.

FIG. 8 is a vertical section view from the downstream side of the detangler and surroundings of a sheet manufacturing apparatus according to a second embodiment of the invention.

A second embodiment of a sheet manufacturing apparatus according to the invention is described below with reference to the figures, focusing on the differences with the foregoing embodiment and omitting or abbreviating description of identical parts.

Except for the configuration of the air current generator, this embodiment is substantially the same as the first embodiment described above.

As shown in FIG. 8, the detangler 18 (process unit) has a housing 182 that encloses the drum 181 rotationally around the center axis $O_{181}$ of the cylindrical body of the drum 181. The housing 182 has vents 182c through which air flows in the direction between the drum 181 and the mesh belt 191 (accumulator). A vent 182c is formed at both the left wall 182a and right wall 182b, and in this embodiment the vents 182c are disposed at a position offset from the bottom of the drum 181.

In this embodiment, the gap between the drum 181 and left wall 182a, and the gap between the drum 181 and the right wall 182b, are sealed by seals 185 around the entire circumference of the drum 181.

In this embodiment, the air current generator 3 has an injector 31 that blows air into the space between the drum 181 and mesh belt 191 (accumulator), creating the air current AC. An injector 31 is disposed on both the left wall 182a side and the right wall 182b side. Working in conjunction with the suction unit 193, the injector 31 can increase the air current AC. The strength of the air current AC can also be suppressed by operating the suction unit 193 without operating the injector 31.

The injector 31 may also be configured to operate independently. In this case, the direction of the air current AC can be adjusted, for example. This configuration can be used to adjust the distribution of the thickness $t_{M8}$ of the second web M8.

As described above, the detangler 18 (process unit) has a housing 182 that encloses the drum 181 rotationally around the center axis $O_{181}$ of the cylindrical body of the drum 181. The housing 182 has vents 182c through which air flows in the direction between the drum 181 and the mesh belt 191 (accumulator).

Each injector 31 has a blower 311, and a conduit 312 connecting the blower 311 to the vent 182c. The blower 311 is a fan (or pump) that pushes air. This air passes through the conduit 312, and is discharged from the vent 182c to the space between the drum 181 and mesh belt 191. This configuration can quickly create an air current AC, and the air current AC can be easily controlled.

Embodiment 3

Figure 9:
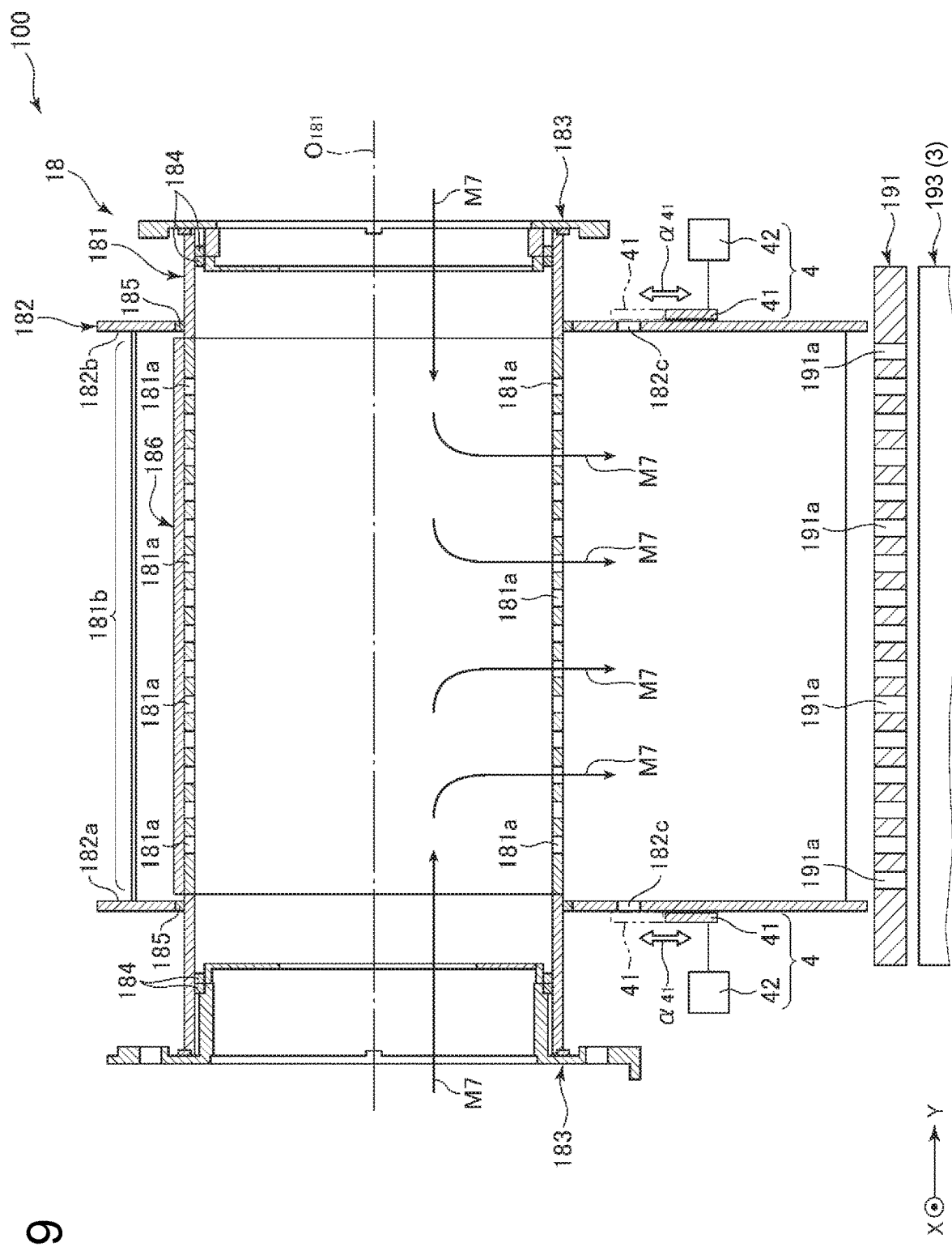
FIG. 9 is a vertical section view from the downstream side of the detangler and surroundings of a sheet manufacturing apparatus according to a third embodiment of the invention.

FIG. 9 is a vertical section view from the downstream side of the detangler and surroundings of a sheet manufacturing apparatus according to a third embodiment of the invention.

A third embodiment of a sheet manufacturing apparatus according the invention is described below with reference to the figures, focusing on the differences with the foregoing embodiment and omitting or abbreviating description of identical parts.

Except for the configuration of the housing of the detangler, this embodiment is substantially the same as the second embodiment described above.

In this embodiment, the air current generator 3 does not have an injector 31, and produces the air current AC by the suction of the suction unit 193 (not shown in FIG. 9).

As shown in FIG. 9, the detangler 18 (process unit) has an adjustment devices 4 for adjusting the size of the vents 182c. Each adjustment device 4 has a shield 41 capable of closing the vent 182c, and a support means 42 that supports the shield 41 movably as indicated by arrow α41, that is, vertically. How much the shield 41 closes the vent 182c, that is, the size of the vent 182c, can be changed by operating the support means 42. This enables adjusting the size of the air current AC. This configuration can be used to adjust the distribution of the thickness $t_{M8}$ of the second web M8.

Note that when the shield 41 is positioned as indicated by the dot-dot-dash line in FIG. 9, the shield 41 completely covers the vent 182c from the outside, and the vent 182c is completely closed. When the shield 41 is positioned as indicated by the solid line in FIG. 9, the shield 41 is retracted from the vent 182c, and the vent 182c is fully open.

The configuration of the support means 42 is not specifically limited, and may be configured with a motor, for example.

Embodiment 4

Figure 10:
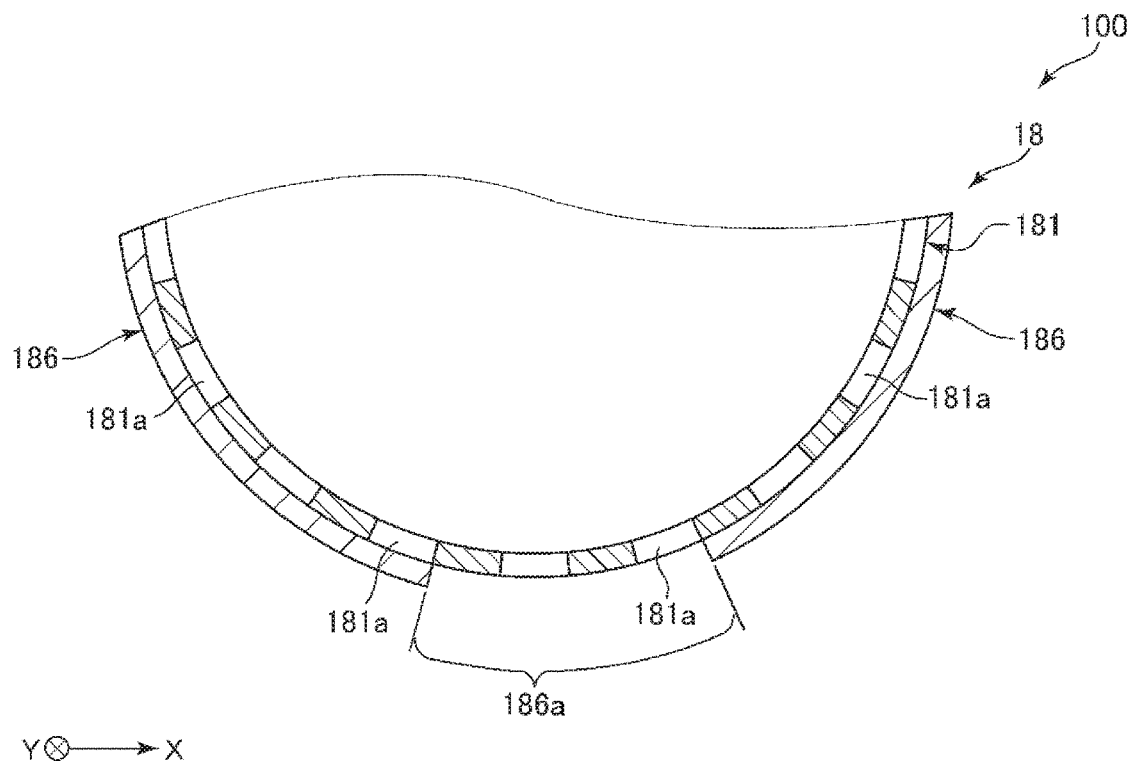
FIG. 10 is a vertical section view of the detangler of a sheet manufacturing apparatus according to a fourth embodiment of the invention.
Figure 11:
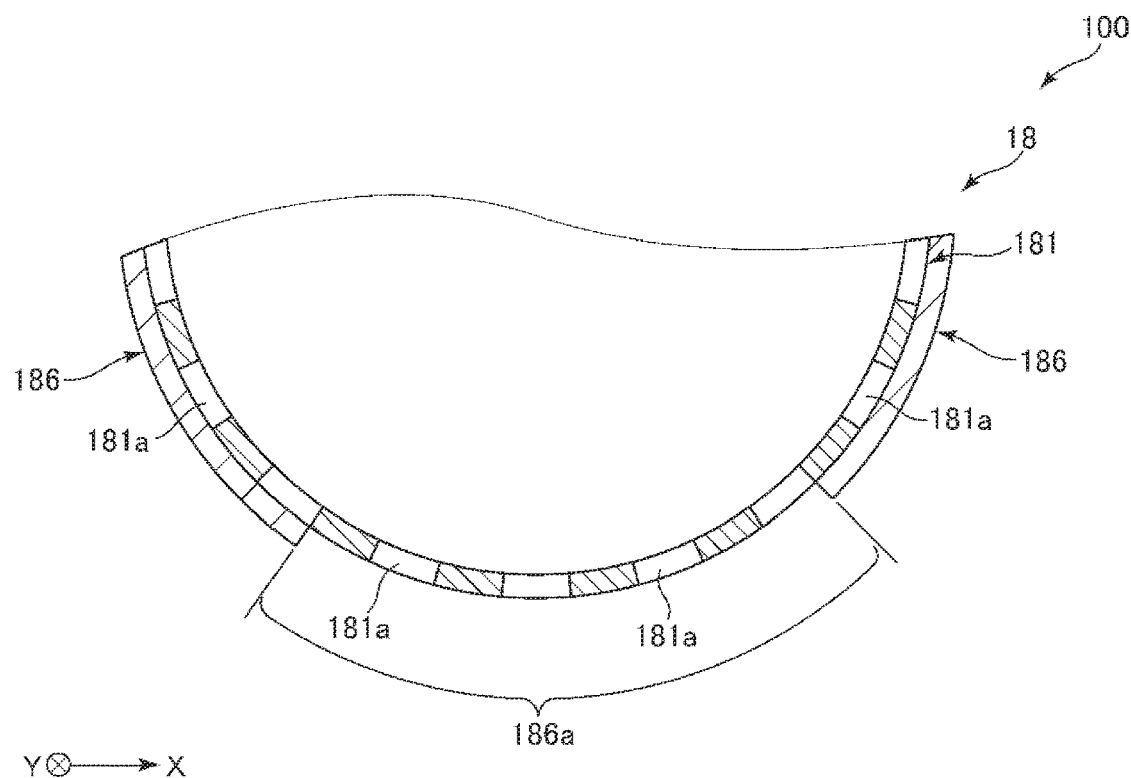
FIG. 11 is a vertical section view of the detangler of a sheet manufacturing apparatus according to a fourth embodiment of the invention.

FIG. 10 and FIG. 11 are vertical sections view of the detangler of a sheet manufacturing apparatus according to a fourth embodiment of the invention.

A fourth embodiment of a sheet manufacturing apparatus according to the invention is described below with reference to the figures, focusing on the differences with the foregoing embodiments and omitting or abbreviating description of identical parts.

Except for the configuration of the seal of the detangler, this embodiment is substantially the same as the first embodiment described above.

As shown in FIG. 10 and FIG. 11, multiple (two in the configuration shown in the figures) seals 186 are disposed around the outside circumference of the drum 181 in this embodiment. Adjacent seals 186 are connected to a drive means not shown, and by operating the drive means, the seals 186 can be moved closer together or farther apart along the circumference of the outside of the drum 181, and can thereby adjust the size of the open area 186a that opens to the bottom, that is, to the mesh belt 191 side (accumulator, not shown in FIG. 10 and FIG. 11).

This configuration also contributes to adjusting the distribution of the thickness $t_{M8}$ of the second web M8. For example, the two seals 186 are set closest together when positioned as shown in FIG. 10. In this position, the thickness $t_{M8}$ of the second web M8 can be suppressed. The seals 186 are farthest apart when position as shown in FIG. 11. In this position, the thickness $t_{M8}$ of the second web M8 can be increased.

Note that the two seals 186 are each connected to a drive means (not shown) in this embodiment, but the invention is not so limited. For example, one seal 186 of the two seals 186 may be connected to a drive means while movement of the other seal 186 along the outside of the drum 181 is restricted.

Note also that there are two seals 186 in this embodiment, but the invention is not so limited and there may be three or more.

Embodiment 5

Figure 12:
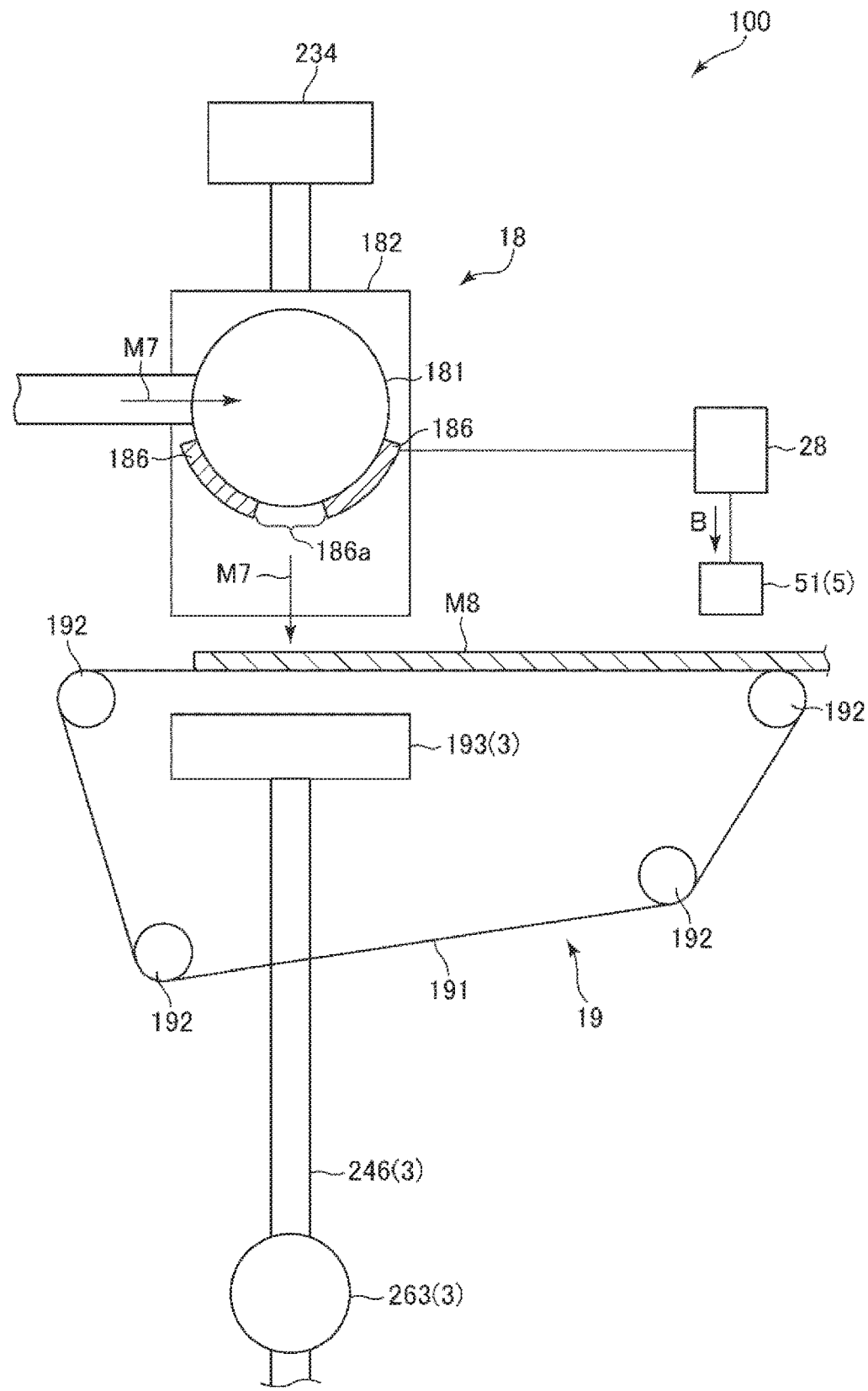
FIG. 12 is a schematic side view of the detangler and second web forming device of a sheet manufacturing apparatus according to a fifth embodiment of the invention.
Figure 13:
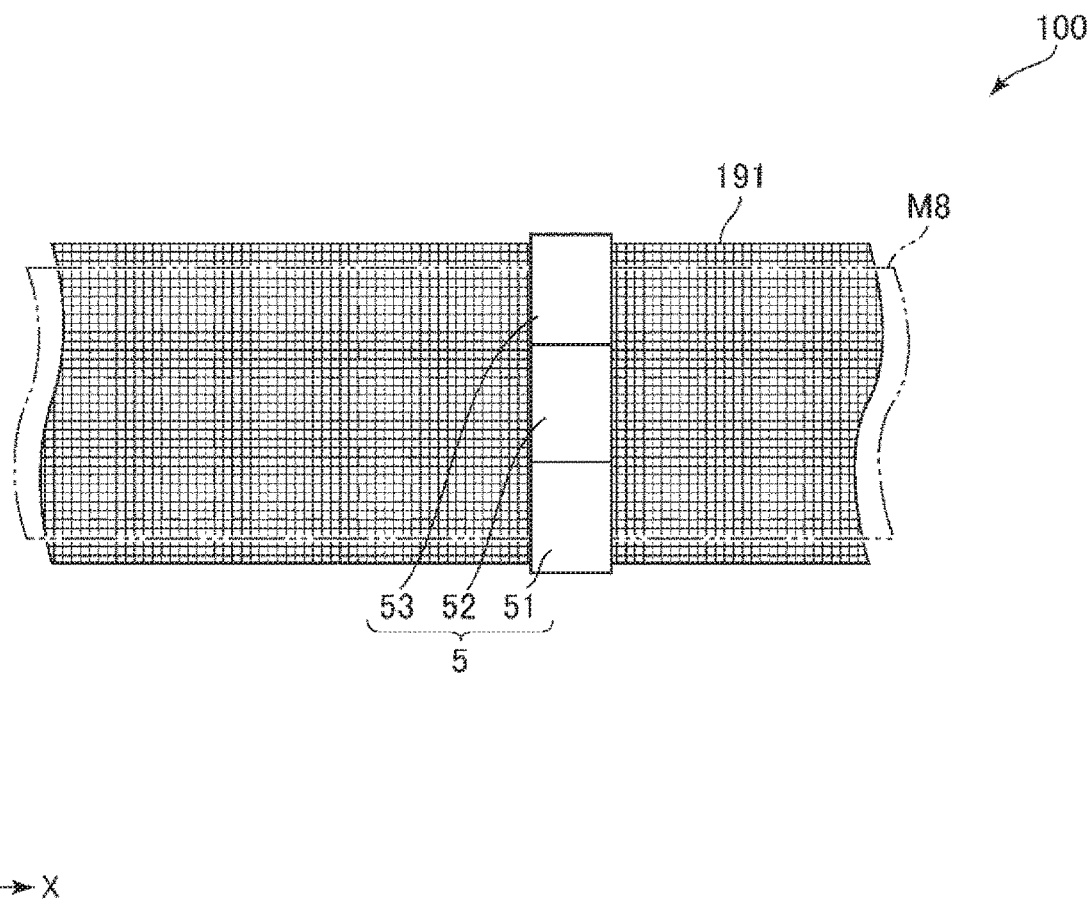
FIG. 13 is a plan view from the viewpoint of arrow B in FIG. 12.

FIG. 12 is a schematic side view of the detangler and second web forming device of a sheet manufacturing apparatus according to a fifth embodiment of the invention. FIG. 13 is a plan view from the viewpoint of arrow B in FIG. 12.

A fifth embodiment of a sheet manufacturing apparatus according the invention is described below with reference to the figures, focusing on the differences with the foregoing embodiment and omitting or abbreviating description of identical parts.

Except for the configuration of the housing of the detangler, this embodiment is substantially the same as the second embodiment described above.

The configuration of this embodiment is the same as the fourth embodiment except for the addition of a detector.

As shown in FIG. 12 and FIG. 13, the sheet manufacturing apparatus 100 in this embodiment of the invention has a detector 5 configured to detect the thickness $t_{M8}$ of the second web M8 (deposit) (or the thickness of the sheet S). As shown in FIG. 13, the detector 5 has a first sensor 51, second sensor 52, and third sensor 53 disposed across the width of the mesh belt 191. The first sensor 51 detects the thickness $t_{M8}$ of the second web M8 at the edge area on the bottom in FIG. 13. The second sensor 52 detects the thickness $t_{M8}$ in the middle of the second web M8 in FIG. 13. The third sensor 53 detects the thickness $t_{M8}$ of the second web M8 at the edge area at the top in FIG. 13.

The configuration of the first sensor 51, second sensor 52, and third sensor 53 is not specifically limited, and in one configuration are optically reflective sensors having an emitter that emits light, and a photodetector that receives the reflection of the light emitted from the emitter and reflected by the second web M8. The first sensor 51, second sensor 52, and third sensor 53 may also be optically transmissive sensors instead of reflective sensors.

As described above, the sheet manufacturing apparatus 100 has a controller 28 that controls operation of the detangler 18 (process unit), second web forming device 19 (accumulator), and air current generator 3. The controller 28 is also electrically connected to the detector 5 and a driver (not shown in the figure) that moves the seals 186. Based on the output from the detector 5, the controller 28 adjusts the opening of the open area 186a, and can thereby change the second web M8 (deposit) formation conditions.

For example, suppose that a second web M8 as shown in FIG. 5 is to be formed, but when the second web M8 is actually formed, the detection output of the detector 5 shows that a second web M8 shaped as shown in FIG. 6 is formed. In this event, a second web M8 as shown in FIG. 5 can be formed by adjusting the size of the opening in the open area 186a.

Note that the relationship between the thickness $t_{M8}$ of the second web M8 and the size of the opening in the open area 186a may be previously determined through tests and stored as a calibration curve in the storage 282.

The detector 5 detector 5 in this example detects the thickness $t_{M8}$ of the second web M8, but the invention is not so limited. For example, if the detection position of the detector 5 is changed from the position shown in FIG. 12 and FIG. 13 to a position downstream, the detector 5 may detect the thickness of the sheet S.

The detector 5 in this embodiment also has three sensors (first sensor 51, second sensor 52, third sensor 53), but the number of sensors is not limited to three, and may be one, two, or four or more.

Embodiment 6

Figure 14:
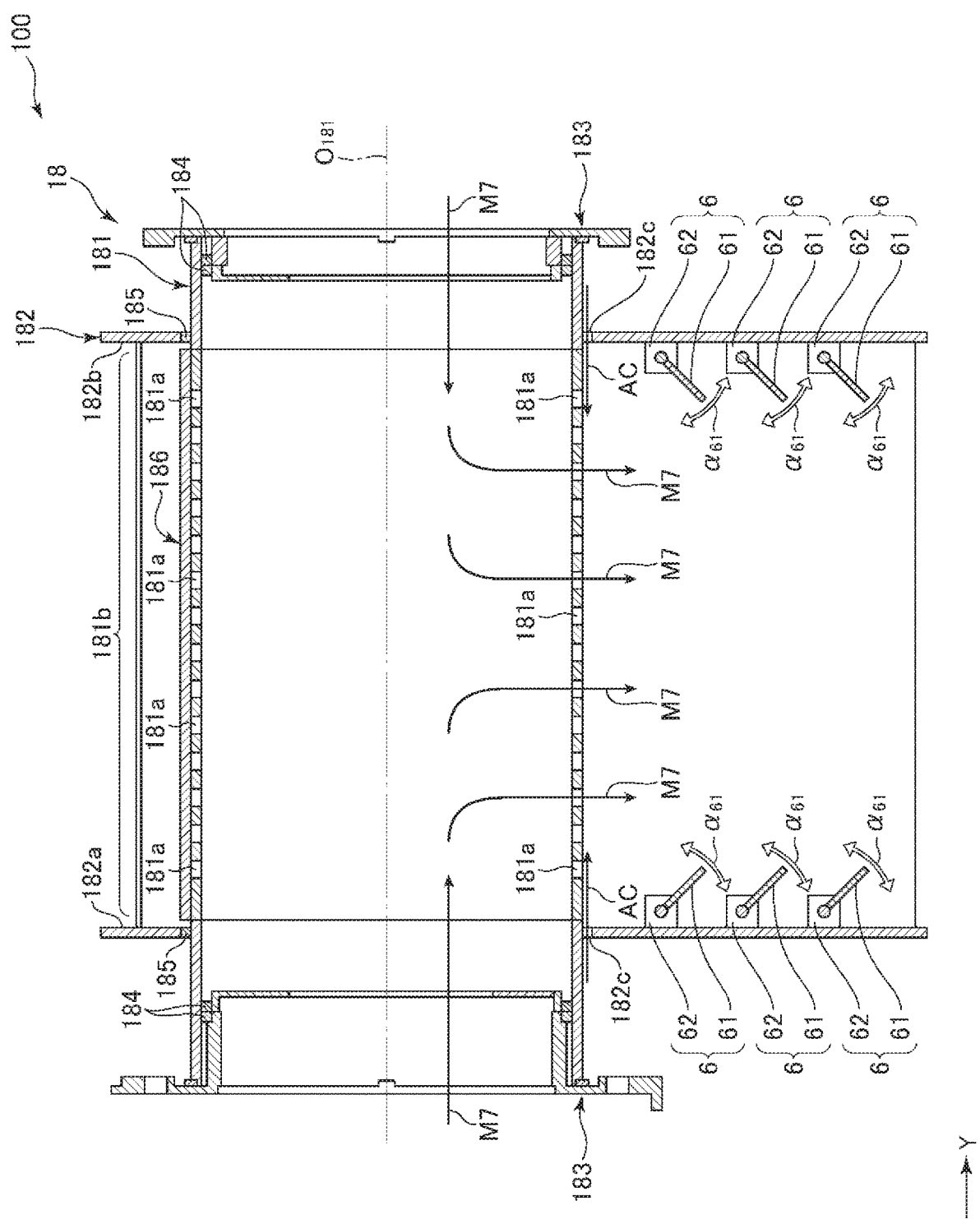
FIG. 14 is a vertical section view from the downstream side of the detangler and surroundings of a sheet manufacturing apparatus according to a sixth embodiment of the invention.

FIG. 14 is a vertical section view from the downstream side of the detangler and surroundings of a sheet manufacturing apparatus according to a sixth embodiment of the invention.

A sixth embodiment of a sheet manufacturing apparatus according the invention is described below with reference to the figures, focusing on the differences with the foregoing embodiment and omitting or abbreviating description of identical parts.

Except for the configuration of the air current rectifier, this embodiment is substantially the same as the first embodiment described above.

As shown in FIG. 14, the sheet manufacturing apparatus 100 in this embodiment has an air current rectifier 6 for adjusting the direction of the air current AC. Three rectifiers 6 are affixed to both the left wall 182a and right wall 182b. The three rectifiers 6 are equally spaced vertically.

Each rectifier 6 includes a louver 61, and a support 62 that supports the louver 61 rotatably in the direction of arrow α61.

The rectifier 6 thus comprised can adjust the direction of the air current AC by changing the angle of rotation of the louver 61. This enables forming a second web M8 with the desired thickness $t_{M8}$.

Note that the rectifiers 6 may be configured to independently change the angles of the respective louvers 61.

The configuration of the support 62 is also not specifically limited, and may be configured with a motor, for example.

Embodiment 7

Figure 15:
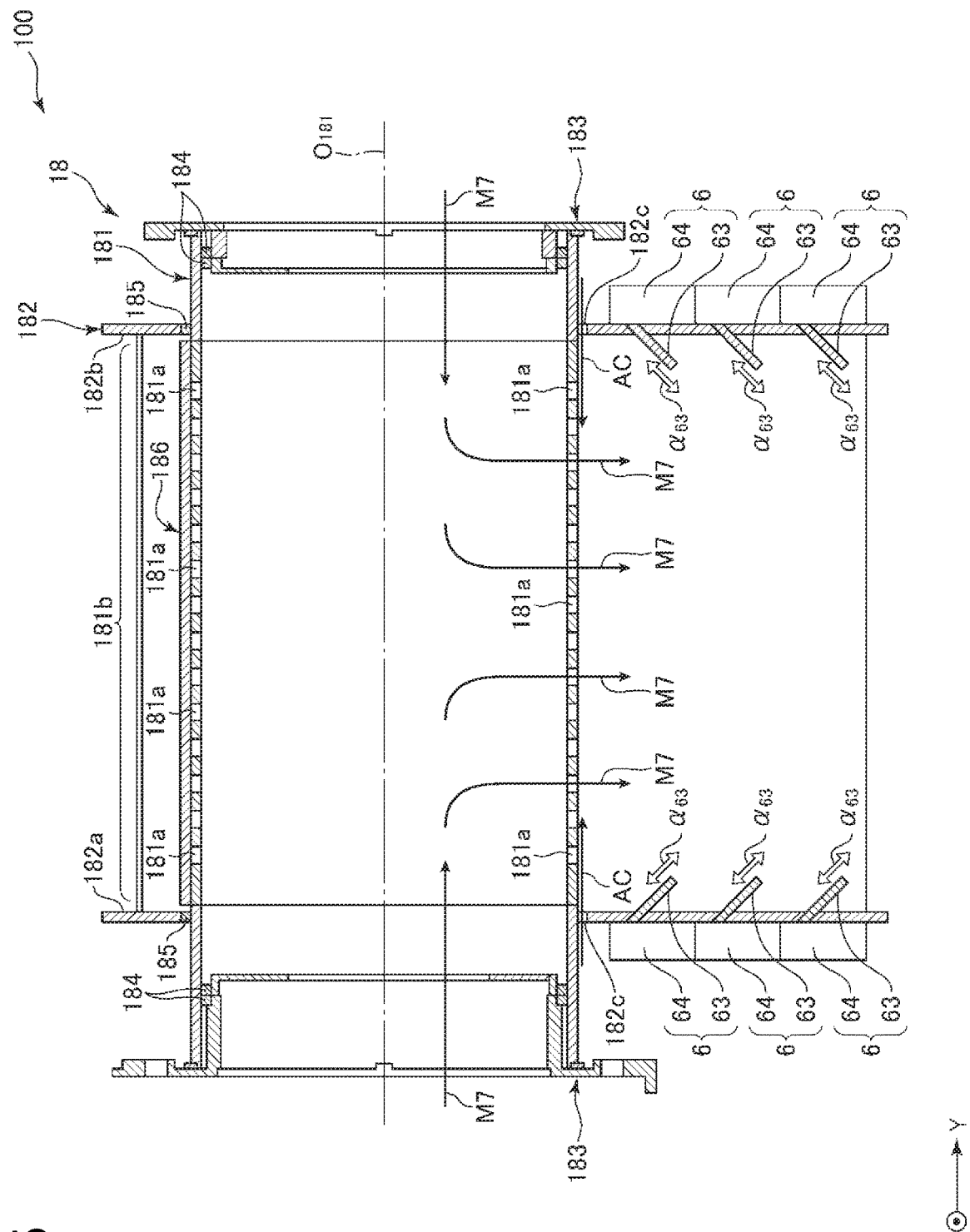
FIG. 15 is a vertical section view from the downstream side of the detangler and surroundings of a sheet manufacturing apparatus according to a seventh embodiment of the invention.

FIG. 15 is a vertical section view from the downstream side of the detangler and surroundings of a sheet manufacturing apparatus according to a seventh embodiment of the invention.

A seventh embodiment of a sheet manufacturing apparatus according the invention is described below with reference to the figures, focusing on the differences with the foregoing embodiment and omitting or abbreviating description of identical parts.

Except for the configuration of the rectifier, this embodiment is substantially the same as the sixth embodiment described above.

As shown in FIG. 15, each rectifier 6 includes a louver 63, and a support 64 that supports the louver 63 movably in the direction of arrow α63.

The rectifier 6 thus comprised can adjust the direction of the air current AC by changing the amount the louver 63 protrudes. This enables forming a second web M8 with the desired thickness $t_{M8}$.

Note that the rectifiers 6 may be configured to independently change the distance the respective louvers 61 protrude.

The configuration of the support 64 is also not specifically limited, and may be configured with a motor, for example.

A sheet manufacturing apparatus according to the invention is described above with reference the accompanying figures, but the invention is not limited thereto, and parts of the sheet manufacturing apparatus may also replaced with equivalent configurations having the same function. Other configurations may also be added as desired.

A sheet manufacturing apparatus according to the invention may be configured with any two or more configurations (features) of the embodiments described above.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims. The entire disclosure of Japanese Patent Application No: 2017-189229, filed Sep. 28, 2017 is expressly incorporated by reference herein.

What is claimed is:

1. A sheet manufacturing apparatus, comprising:
    a drum unit having (i) a cylinder with a defibrated material storage space inside and (ii) a plurality of openings configured to allow for defibrated material to pass through, the plurality of openings being formed in the outside of the cylinder;
    an accumulator comprising a belt, the accumulator configured to accumulate the defibrated material that passes through the plurality of openings, the accumulated defibrated material forming a deposit; and
    a housing configured to enclose the drum unit,
        wherein the housing has a vent through which air passes between the drum unit and the accumulator, and
        wherein the housing includes a first longitudinally extending portion and a second longitudinally extending portion, the vent having a longitudinal axis and longitudinally extending in a same direction as the first longitudinally extending portion and as the second longitudinally extending portion.

2. The sheet manufacturing apparatus described in claim 1, further comprising:

a suction mechanism disposed within the accumulator and configured to suction air between the drum unit and the accumulator.

3. The sheet manufacturing apparatus described in claim 2, wherein:
the accumulator has a belt configured to convey the deposit;
the belt has through-holes provided through a thickness of the belt; and
the suction unit his disposed on the opposite side of the belt as the drum unit.

4. The sheet manufacturing apparatus described in claim 1, further comprising:
an injector comprising a blower, the injector configured to inject air through the vent to between the drum unit and the accumulator.

5. The sheet manufacturing apparatus described in claim 1, further comprising:
an adjustment device comprising a movable shield, the adjustment device configured to adjust a size of the vent.

6. A sheet manufacturing apparatus, comprising:
a drum unit having (i) a cylinder with a defibrated material storage space inside and (ii) a plurality of openings configured to allow for defibrated material to pass through, the plurality of openings being formed in the outside of the cylinder;
an accumulator comprising a belt, the accumulator configured to accumulate the defibrated material that passes through the plurality of openings, the accumulated defibrated material forming a deposit; and
a plurality of seals disposed circumferentially on the outside of the drum unit,
wherein adjacent seals of the plurality of seals are configured to move towards or away from each other along a circumference of the outside of the drum unit.

7. The sheet manufacturing apparatus described in claim 1, further comprising:
a detector comprising at least one sensor, the detector configured to detect a thickness of the deposit or a thickness of the sheet.

8. The sheet manufacturing apparatus described in claim 7, further comprising:
a controller having a processor configured to change a formation condition of the deposit based on a detection result of the detector.

9. The sheet manufacturing apparatus described in claim 1, further comprising:
an air current rectifier disposed to the housing.

10. The sheet manufacturing apparatus according to claim 1, wherein the drum includes a sieve with a cylindrical body rotating along its center axis.

11. The sheet manufacturing apparatus according to claim 1, wherein the accumulator is a mesh belt on which the deposit accumulates.

12. The sheet manufacturing apparatus according to claim 1, wherein the vent is provided between the first longitudinally extending portion and the second longitudinally extending portion along the longitudinal axis.

13. A sheet manufacturing apparatus for making a sheet from defibrated material of defibrated paper, the apparatus comprising:
a drum unit having (i) a cylinder with a defibrated material storage space inside and (ii) a plurality of openings through which the defibrated material passes, the plurality of openings formed in the outside of the cylinder;
an accumulator comprising a belt, the accumulator that accumulates the defibrated material that passes through the openings, the accumulated defibrated material forming a deposit; and
a housing that encloses the drum unit,
wherein the housing has a vent through which air passes between the drum unit and the accumulator, and
wherein the housing includes a first longitudinally extending portion and a second longitudinally extending portion, the vent having a longitudinal axis and longitudinally extending in a same direction as the first longitudinally extending portion and as the second longitudinally extending portion.

* * * * *